UNITED STATES PATENT OFFICE.

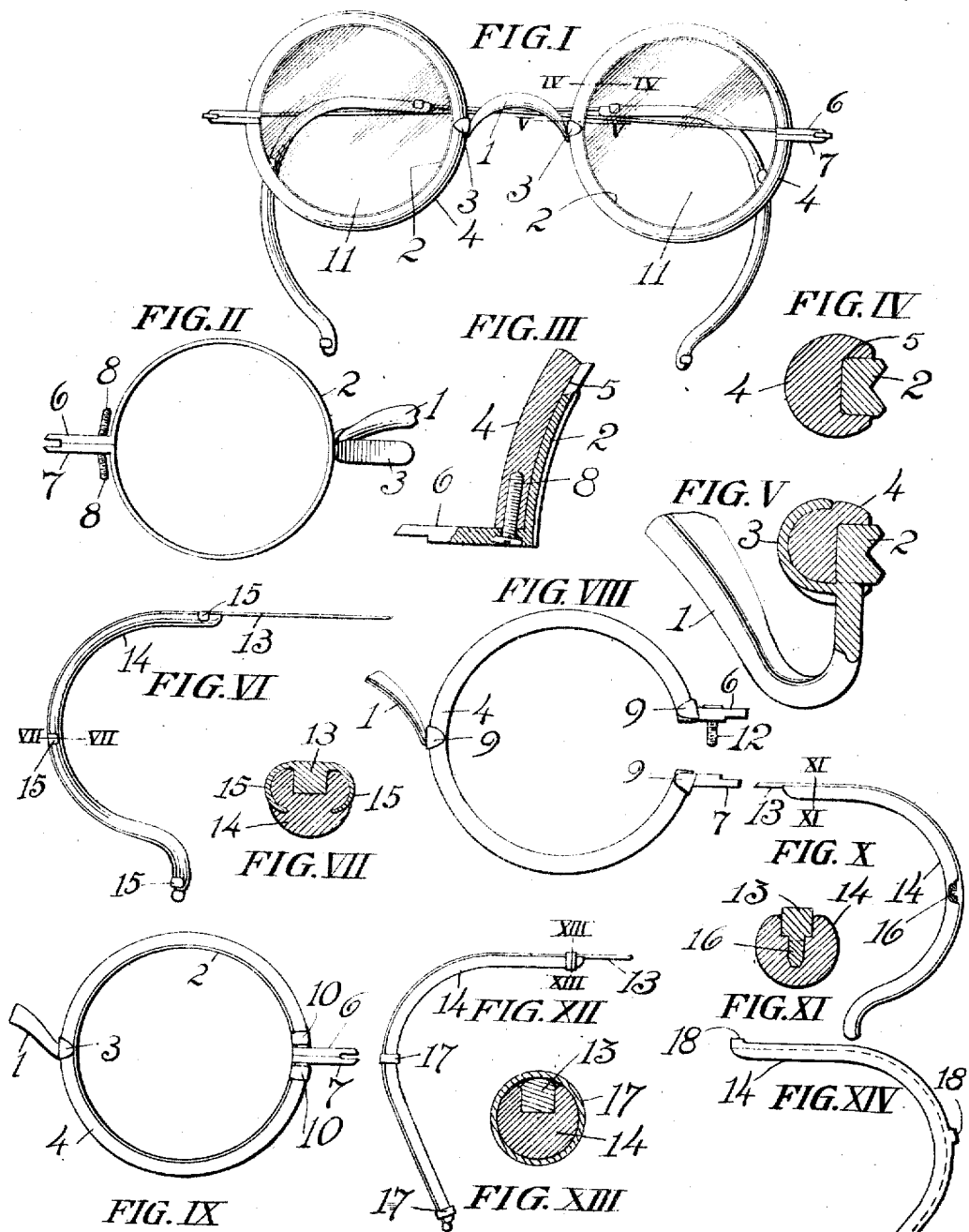

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,241,718.      Specification of Letters Patent.      Patented Oct. 2, 1917.

Application filed December 11, 1916. Serial No. 136,254.

*To all whom it may concern:*

Be it known that I, GEORGE H. DAY, a citizen of the United States, residing at Southbridge, in the county of Worcester and State of Massachusetts, have invented certain new and useful Improvements in Ophthalmic Mountings, of which the following is a specification.

My invention relates to improvements in ophthalmic mountings and has particular reference to an improved form of mounting or frame of what is commonly termed the combination type, that is to say a mounting made up of combined metal and zylonite or other non-metallic parts.

One of the leading objects of the present invention is the provision of a novel and improved construction of frame making use of improved means for uniting the metallic and non-metallic parts.

A further object of the present invention is the provision of an improved construction of frame of this character in which the non-metallic material encircling the lens shall be split at least at one point to facilitate insertion and removal of the lenses.

A further object of the invention is the provision of a mounting of this character in which the greater portion of the metal of the frame shall be so covered as to prevent it from coming into contact with the face of the wearer, thereby rendering the frame as a whole much more comfortable to wear than is the case when the metallic parts are in contact with the flesh and at the same time preserving the durability and adding to the appearance of the mounting.

Other objects and advantages of the invention include the simplification and improvement of the details of construction of the several parts going to make up the complete mounting, and should be readily apparent by reference to the following specification taken in connection with the accompanying drawings forming a part thereof, and it will be understood that I may make any modifications in the specific details of construction shown and described within the scope of the appended claims without departing from or in anywise exceeding the spirit of my invention.

Figure I represents a front view of an improved mounting embodying my several improvements.

Fig. II represents a fragmentary detail view of one style of metallic part therefor.

Fig. III represents a fragmentary detail sectional view illustrating one manner of connecting the end of the zylonite to the frame.

Fig. IV represents a sectional view taken on the line IV—IV of Fig. I.

Fig. V is a similar sectional view on the line V—V of said figure.

Fig. VI represents a side elevation of one form of temple bearing a non-metallic covering.

Fig. VII represents a sectional view as or the line VII—VII of Fig. VI.

Fig. VIII represents a fragmentary view illustrating one form of my split non-metallic lens rim.

Fig. IX represents a similar view illustrating another form of combined metallic and non-metallic split lens rim.

Fig. X represents a view of a modified temple construction.

Fig. XI represents a sectional view taken as on the line XI—XI of Fig. X.

Fig. XII represents a view of another form of temple.

Fig. XIII represents a sectional view thereof on the line XIII—XIII of Fig. XII.

Fig. XIV represents a side elevation of a further modification of my temple construction.

In the drawings, in which similar characters of reference are employed to denote corresponding parts throughout the several views, the numeral 1 designates the spectacle bridge or center for connecting the lenses, in the form shown in Fig. I the bridge ends being secured as by soldering to the metallic lens frame 2, and continued inwardly in the clip fingers or clip 3 adapted to be bent around and clampingly secure in position the inner portion of a zylonite or other non-metallic frame member 4 as illustrated in Fig. V for example. This frame member 4 is preferably formed with the channel 5, into which the metallic frame fits and has its end split and secured to suitable end pieces to facilitate insertion and removal of a lens from the frame.

In the form of the invention illustrated in Figs. I and II, I have shown the metallic rim 2 as encircling the lens and terminating at its outer portion in the end pieces 6 and 7, which are provided with suitable means for clampingly or grippingly engaging the ends of the zylonite rim or frame 4. In Fig. III, I have specifically illustrated one construction for this purpose, in which the screw or fastening devices 8 are engaged in the end pieces and extend upward into the zylonite or non-metallic rim to securely retain the ends thereof in engagement with the end pieces 6 and 7.

In Fig. VIII, I have illustrated, however, a construction in which the central metallic rim or frame member is dispensed with and the end pieces are provided with the embracing yoke or ear portion 9, clampingly engaging the ends of the zylonite to secure the end pieces thereto, while in Fig. IX, I have again illustrated the use of the metallic frame 2 having secured to its ends the end pieces 6 and 7, which end pieces have secured either directly thereto or as a part of and through the medium of the frame 2, the embracing fingers or clamp 10, which extend around the zylonite at or adjacent its lower end, and serve to grippingly or clampingly unite the end pieces thereto to hold the zylonite closed around the lenses 11 when the latter are in position within the frame.

In any event the main essential characteristic will be noted, that is to say, that the zylonite rim instead of being continuous in the usual manner, with the lenses sprung thereinto, is split at the outer side but preferably formed without heavy outwardly extending terminal ends or the like, detracting from the ornamental appearance of the mounting, and in place of such ends that metallic end pieces are employed suitably joined together, as by the connecting screw 12, to connect the end pieces, and these end pieces are united by suitable gripping or clamping members to the ends of the zylonite frame and thus serve to satisfactorily retain the zylonite or non-metallic frame in position about the lenses, either with or without the interposition of the metallic rim or zylonite-liner 2.

To additionally increase the desirability of my frame and to cause the several parts to substantially correspond and be constructed in the neatest and most practical and durable manner and to facilitate ready adjustment of the several parts of the mounting, I preferably provide as a part of the complete frame, my improved temples, which like the frames, may have the base or foundation portion 13 and the zylonite or non metallic portion 14. One form of this construction has been illustrated in Figs. VI and VII, in which the zylonite has been formed of channel construction, in the same manner as the portion 4 used to encircle the lenses and receives the metallic part 13 within the channel. Suitable clips 15, which in Fig. VII are illustrated as being soldered or secured to the temple wire 13, are shown as partially embracing and clampingly or grippingly engaging and securing the zylonite in position in the same manner that the clip fingers 3 and 10, illustrated in Figs. I and IX, serve to clampingly secure the portion 4 in position.

Figs. X and XI illustrate a slight modification of this construction, in which in place of the clamping fingers biting prongs 16 are employed to retain the non-metallic member in position, ferrules 17 being shown for a similar purpose in Figs. XII and XIII, while clip fingers 18 on the non-metallic member clampingly engaging the metallic member, are illustrated in Fig. XIV, the purpose in all instances being the satisfactory securing of the non-metallic to the metallic member.

From the foregoing specification taken in connection with the accompanying drawings, the construction and advantages of my improved combined metal and non-metallic frame should be readily apparent, and it will be seen that I have provided an improved frame which will present a neat and attractive appearance on the face, which will comprise the split zylonite rims having their ends detachably secured one to the other by neat and inconspicuous metallic end pieces, thus facilitating the insertion and removal of the lenses in a well known manner, without the necessity of peculiar and special construction or heavy and ungainly parts, and it will be further noted that by my improved frame I form the major visible portion thereof of a clean, sanitary and comfortable feeling, and untarnishable non-metallic composition, with the working parts, such as temple ends, end pieces, bridging member, and the like, formed from metallic material which will present a neat appearance and will be of less size for correspondingly desired strength, but that I place, as on the temples and metallic lens rims, if employed, a covering of the non-metallic covering, which will feel soft and comfortable when engaging the face, and will remove the liability of undue wear and tarnishing of the ordinarily thinly covered gold-filled material customarily employed for these purposes.

I claim:

1. In a mounting of the character described, the combination with a metallic bridge, of metallic lens frames secured thereto and having interior grooves to receive a lens and non-metallic frames having channels receiving the metallic frames, said non-metallic frames encircling the metallic frames and having their ends secured to the ends of the metallic frames by threaded fastening devices.

2. In an ophthalmic mounting, the combination with a metallic frame embracing a lens, said frame being split at one side and having end pieces secured to its ends and extending outwardly therefrom, of a non-metallic frame member having a channel receiving the metallic frame member and extending around said frame member, and threaded fastening devices passing through the end piece sections and into the ends of the non-metallic frame member for tightening said ends against the end pieces and positively securing the non-metallic frame in position around the metallic frame.

3. In an ophthalmic mounting, the combination with a bridge, of metallic frames secured thereto and adapted to directly engage the lenses, said frames being split at one side and provided with suitable end pieces, a non-metallic frame fitting around the metallic frame and terminating adjacent the end pieces, fastening devices passing through the end pieces and engaged in the ends of the non-metallic frame for securing it in position about the metallic frame, and supplemental fingers carried by the metallic frame and encircling the non-metallic frame for supplementing the action of said fastening devices in positively securing the parts together.

4. In an ophthalmic mounting, the combination with a metallic lens encircling rim having laterally extending connecting plates or end pieces secured to its ends, said end pieces having apertures formed therethrough immediately adjacent their points of attachment to the metallic frames, of non-metallic frames encircling the metallic frames and having channels receiving and concealing said metallic frames, said non-metallic frames terminating at and abutting the outer faces of the connecting plates or end pieces and overlying the apertures therein, and fastening devices each engaged in one of the apertures and projecting therethrough into engagement with the adjacent end of the non-metallic frame member to firmly secure the non-metallic frame member to the connecting plate or end piece and lock the metallic frame member within the groove of the non-metallic frame member, substantially as illustrated.

5. In an ophthalmic mounting, the combination with a metallic lens receiving frame for direct engagement with the lens, of a non-metallic frame surrounding and concealing the metallic frame, the said metallic and non-metallic frames being split at one side to facilitate insertion or removal of the lens, and fastening devices securing the ends of the non-metallic to the ends of the metallic frame to securely unite the two frames.

In testimony whereof I affix my signature in the presence of two witnesses.

GEORGE H. DAY.

Witnesses:
EDITH M. HALVORSEN,
J. JOSEPH MACCARTHY.